United States Patent [19]

Ohta et al.

[11] Patent Number: 4,791,019

[45] Date of Patent: Dec. 13, 1988

[54] POLYURETHANE FOAM INTERIOR FINISHING MATERIAL HAVING FACING AND PROCESS FOR PREPARING THE SAME

[75] Inventors: Takamichi Ohta, Kobe; Takashi Izumi, Toyota; Takeshi Yamazi; Shigeyoshi Fukushima, both of Nagoya, all of Japan

[73] Assignee: Toyo Tire & Rubber Company Limited, Osaka, Japan

[21] Appl. No.: 157,872

[22] Filed: Feb. 19, 1988

[30] Foreign Application Priority Data

Feb. 20, 1987 [JP] Japan .................................. 62-38383

[51] Int. Cl.$^4$ .............................................. B32B 3/26
[52] U.S. Cl. ................................ 428/304.4; 264/45.3; 428/309.9; 428/317.5; 428/317.9
[58] Field of Search ..................... 264/45.3; 428/304.4, 428/309.9, 311.1, 311.5, 317.5, 317.9

[56] References Cited

U.S. PATENT DOCUMENTS

| | | | |
|---|---|---|---|
| 3,591,444 | 7/1971 | Hoppe | 428/317.9 |
| 4,136,223 | 1/1979 | Harder | 428/309.9 |
| 4,292,363 | 9/1981 | Briggs | 428/317.9 |
| 4,292,369 | 9/1981 | Ohashi et al. | 428/317.5 |

*Primary Examiner*—William J. Van Balen
*Attorney, Agent, or Firm*—Armstrong, Nikaido, Marmelstein & Kubovcik

[57] ABSTRACT

The present invention provides a polyurethane foam interior finishing material having a facing, characterized in that the material comprises a laminate of a thermoplastic synthetic resin facing material and an expanded pad layer, the expanded pad layer comprising a semi-rigid polyurethane foam reinforced with long glass fibers, the long glass fibers being present in the pad layer primarily in the vicinity of the rear side thereof, the finishing material having no core. The invention also provides a process for preparing the material.

4 Claims, 2 Drawing Sheets

POLYURETHANE FOAM INTERIOR FINISHING MATERIAL HAVING FACING AND PROCESS FOR PREPARING THE SAME

The present invention relates to a polyurethane foam interior finishing material having a facing for use in the interior of motor vehicles, rolling stock, aircraft, ships and other transport means, for example, for console boxes, door trims, instrument panels and shaped ceilings, or for other interior articles such as furniture. The invention also relates to a process for preparing the material.

For example, conventional materials for use in interior articles for motor vehicles can be divided generally into the following two types.

1. Resin injection type

Common materials of this type are filler-containing polypropylene (PP), acrylonitrile-butadiene-styrene resin (ABS), acrylonitrile-styrene glass fiber reinforced resin (ASG), Noryl resin, etc. These materials are chiefly used for console boxes, door trims, instrument panels and the like. However, molded products of such resins do not feel soft, are not flexible and therefore still remain to be improved from the viewpoint of safety.

2. Pad-incorporating type

In view of the above problem, various interior finishing materials or parts have been developed and placed into use which are in the form of a laminate comprising a facing, a core and a cushion pad interposed therebetween so as to provide interior articles having a soft feel and flexibility and to provide moldings of excellent decorative effect. For example, such molded products are prepared by coating a die with a non-yellowing urethane composition having high durability to form a facing first, and injecting an expandable polyurethane solution into the die to form a pad between the facing and a core. Further molded products are prepared by injecting an expandable polyurethane solution into a space between a resin or iron core and a facing which is produced by vacuum forming, blow molding or slush molding. Also introduced into use are molded products which are prepared by adhesive-bonding a facing, having a polyurethane cushion material laminated thereto, to a core by vacuum forming.

The products of the types mentioned above all comprise three layers, i.e., facing, cushion material and core, and must be prepared by a complex process including the injection molding of the core and the cushion material or the lamination of the cushion material to the facing, and the subsequent vacuum molding. The products therefore have the drawback of low productivity. Such molded materials or parts incorporating a pad are used mainly for shaped ceilings, instrument panels, door trims, etc.

Materials of another type, i.e. of simpler structure, are known which comprise a rigid core and an expanded polyvinyl chloride composition and which are produced by injection molding. Further recently, a material having no rigid core has been developed which comprises a facing having a cushion pad laminated thereto and a rigid polyurethane foam formed on the laminated pad by reaction injection molding. This material is used chiefly for door trims and console boxes.

An object of the invention is to provide a polyurethane foam interior finishing material which has a facing but no core of resin, iron or the like and which is simplified in structure and can be produced with an improved efficiency and at a reduced cost.

Another object of the invention is to provide a polyurethane foam interior finishing material which has a facing and which is lightweight, excellent in hand and soft feel and yet fully satisfactory in rigidity and strength.

The above and other objects of the invention will become apparent from the following description.

The present invention provides a polyurethane foam interior finishing material having a facing, characterized in that the material comprises a laminate of a thermoplastic synthetic resin facing material and an expanded pad layer, the expanded pad layer comprising a semi-rigid polyurethane foam reinforced with long glass fibers, the long glass fibers being present in the pad layer primarily in the vicinity of the rear side thereof, the finishing material having no core. The invention also provides a process for preparing the material.

The polyurethane foam finishing material of the invention comprises a special single composite material which is composed of a semi-rigid polyurethane foam and long glass fibers which are present in the foam locally in a specified portion so as to permit the foam layer to retain an excellent soft feel on the facing side thereof and to possess sufficient regidity and strength on the other side, i.e. the rear side thereof, although the finishing material has no core incorporated therein. Thus, the present material has a simplified structure and can be prepared efficiently by a process of shortened cycle.

The thermoplastic synthetic resin facing material to be used in the present invention can be a known one. For example, the facing material can be prepared from a synthetic resin such as polyvinyl chloride (PVC), polyurethane, acrylonitrile-butadiene-styrene resin (ABS), polyethylene, polypropylene, polyester or nylon as by slush molding, vacuum molding or mold coating. Preferably, the facing is about 0.5 to about 2.0 mm in thickness.

The expanded pad layer to be laminated to the facing material according to the invention comprises a semi-rigid polyurethane foam reinforced with long glass fibers which are present in the foam layer primarily in the vicinity of the rear side thereof (opposite to the facing side). The use of this special single composite material having glass fibers thus incorporated therein makes it possible to provide the present polyurethane foam interior finishing material which has a facing and which possesses an excellent soft feel and excellent rigidity and strength.

The expanded pad layer can be prepared from a known semi-rigid polyurethane solution. To be suitable, the semi-rigid polyurethane foam is about 0.04 to about 0.06 g/cm$^3$ in density, and is 30±10 seconds in cream time, 120±30 seconds in gel time and 150±30 seconds in rise time with respect to the reactivity. Preferably the clearance between the foaming dies is so determined that the resulting foam layer has a thickness of at least about 5 mm. Although known long glass fibers are usable, it is very desirable to use a glass fiber mat [such as a continuous strand mat (CSM), product of Asahi Fiber Glass Co., Ltd.] which is prepared by arranging continuous long glass fibers spirally into at least one layer and shaping the layer into a mat with a binder. A satisfactory result can be achieved by positioning long glass fibers in the pad layer primarily in the vicinity of the rear side thereof opposite to the facing side. Of course, the glass fibers may partially be present toward the facing side.

BRIEF DESCRIPTION OF THE DRAWINGS

The present invention will be described with reference to the drawings. FIG. 1 is a fragmentary enlarged view in section showing a polyurethane foam interior finishing material having a facing and embodying the invention. An expanded pad layer 2 laminated to the facing 1 has incorporated therein long glass fibers 3 as positioned locally chiefly in the vicinity of the rear side of the layer.

A process will be described below for preparing a console box as an example of polyurethane foam interior finishing material of the invention. With reference to FIG. 2, a facing 1 is set in a lower die 4, a semi-rigid urethane foam solution 5 is then injected into the die, and a mat of long glass fibers 3 is set on the top of the lower die immediately thereafter. On completion of the setting, an upper die 6 is fitted to the lower die, and the die assembly is heated for curing. The molding released from the dies is in the form of a console box of polyurethane foam having the facing and the structure shown in FIG. 1 in section. It is desired that the mat of glass fibers be placed on the lower die as quickly as possible while the urthane is still liquid. When members such as connectors or fasteners for fixing the material are to be attached to the material, it is desirable to increase the strength of the attaching portions by increasing the thickness of the foam layer or using a larger amount of glass fiber for reinforcement. The fixing members are set on the upper die so as to be embedded in the foam layer in position.

Next with reference to FIGS. 3(1) to (8), a process will be described for preparing an instrument panel as another example of interior finishing material of the invention. FIG. 3(1) shows an upper die 7 and a lower die 8 for molding. A facing 9 is set in the lower die 8, a semi-rigid urethane foam solution 10 is then injected into the die from a mixing head 11, and a mat of long glass fibers 12 is set on the top of the lower die immediately thereafter. After the completion of setting, the upper die 7 is fitted to the lower die, and the die assembly is heated for curing. The molding released from the dies is a block of polyurethane foam 13 having the facing as seen in FIG. 3(6). The block is then trimmed to remove the fins 14, whereby an instrument panel 15 is obtained which has the facing as shown in FIG. 3(8) in section. Indicated at 16 and 16' are urethane foam layers.

Figure 1:
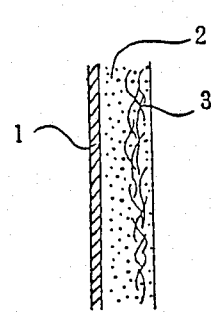
FIG. 1 is a fragmentary view of an interior finishing material.
Figure 2:
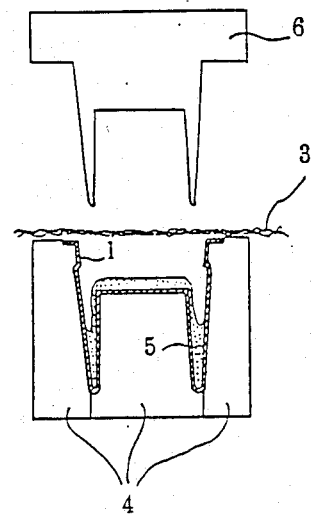
FIG. 2 shows a process for preparing a console box.
Figure 3:
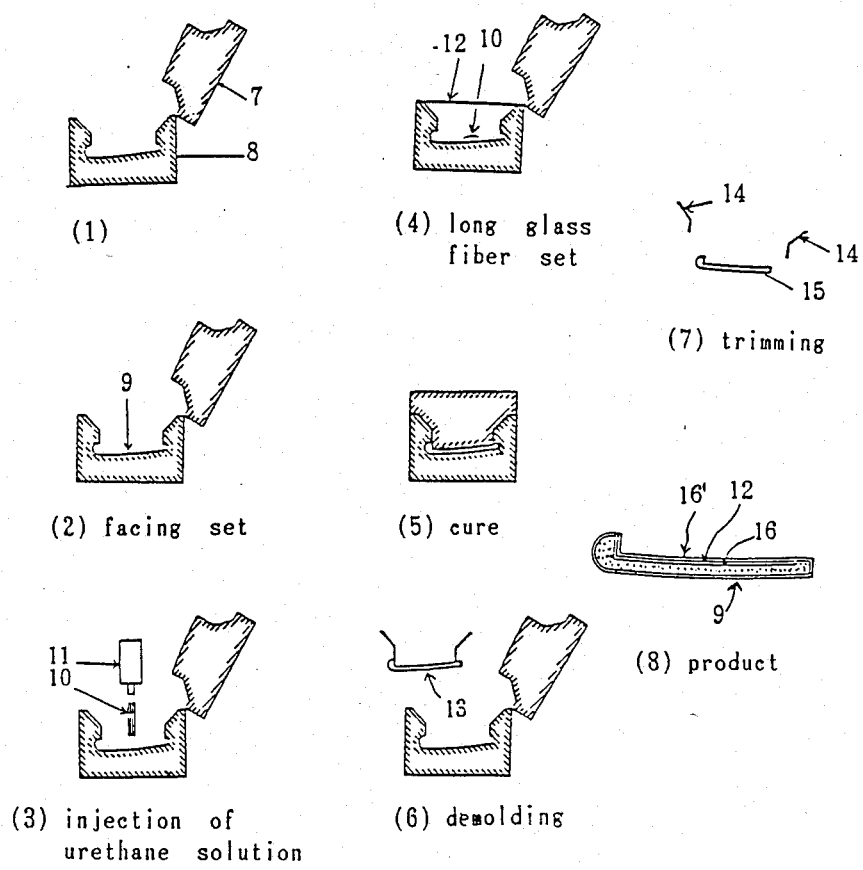
FIG. 3 shows a process for preparing an instrument panel.

Whereas an expanded pad layer and a core separate therefrom are used for forming conventional interior finishing materials, the polyurethane foam interior finishing material of the invention comprises a single composite material, i.e., a semi-rigid polyurethane foam which is reinformed with long glass fibers as positioned in a specified position. The use of the composite material obviates the need to use the core heretofore used generally, simplifies the structure of the finishing material and makes it possible to produce the material with an improved efficiency at a lower cost.

The use of the special single composite material comprising a semi-rigid polyurethane foam layer and long glass fibers which are present in the layer locally in the specified portion enables the foam layer of the present material to retain an excellent soft feel on the facing side thereof and to possess sufficient rigidity and strength on the opposite rear side.

We claim:

1. A polyurethane foam interior finishing material having a facing, characterized in that the material comprises a laminate of a thermoplastic synthetic resin facing material and an expanded pad layer, the expanded pad layer comprising a semi-rigid polyrethane foam reinforced with long glass fibers, the long glass fibers being present in the pad layer primarily in the vicinity of the rear side thereof, the finishing material having no core.

2. An interior finishing material as defined in claim 1 wherein the long glass fibers are in the form of a mat prepared by spirally arranging the fibers into at least one layer and applying a binder to the layer.

3. A process for preparing a polyurethane foam interior finishing material having a facing, characterized by setting a thermoplastic synthetic resin facing material in a lower die, injecting a semi-rigid urethane form solution into the die over the facing material, subsequently setting long glass fibers on the upper portion of the lower die, thereafter closing the lower die with an upper die and curing the solution.

4. A process as defined in claim 3 wherein the long glass fibers are in the form of a mat prepared by spirally arranging the fibers into at least one layer and applying a binder to the layer.

* * * * *